Figure 3:
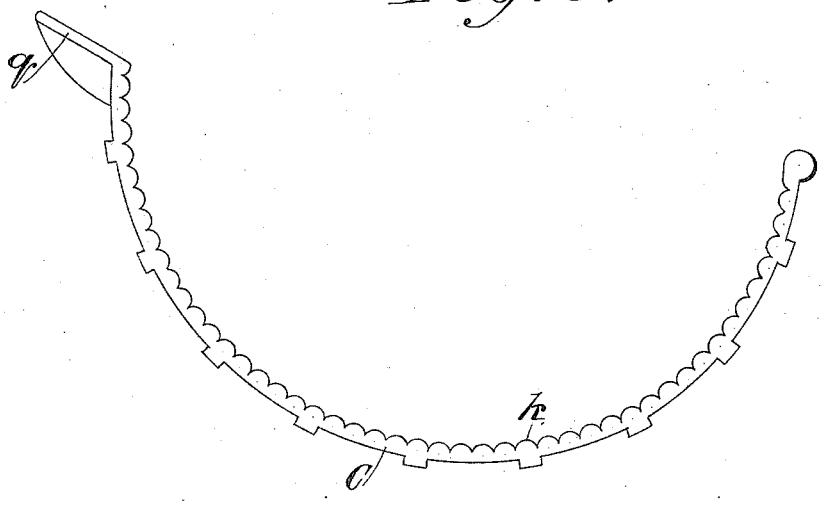

(No Model.)  2 Sheets—Sheet 1.
F. M. AVERY.
MACERATING MACHINE.
No. 307,702.  Patented Nov. 4, 1884.
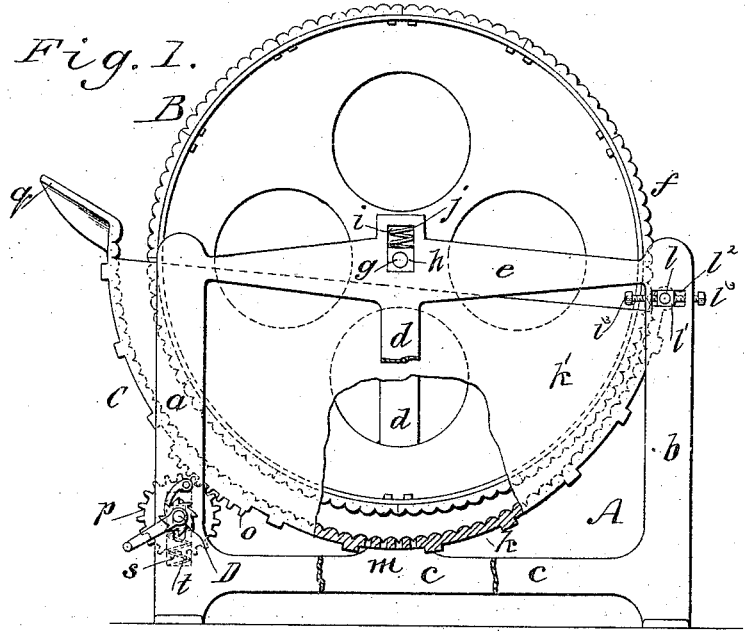
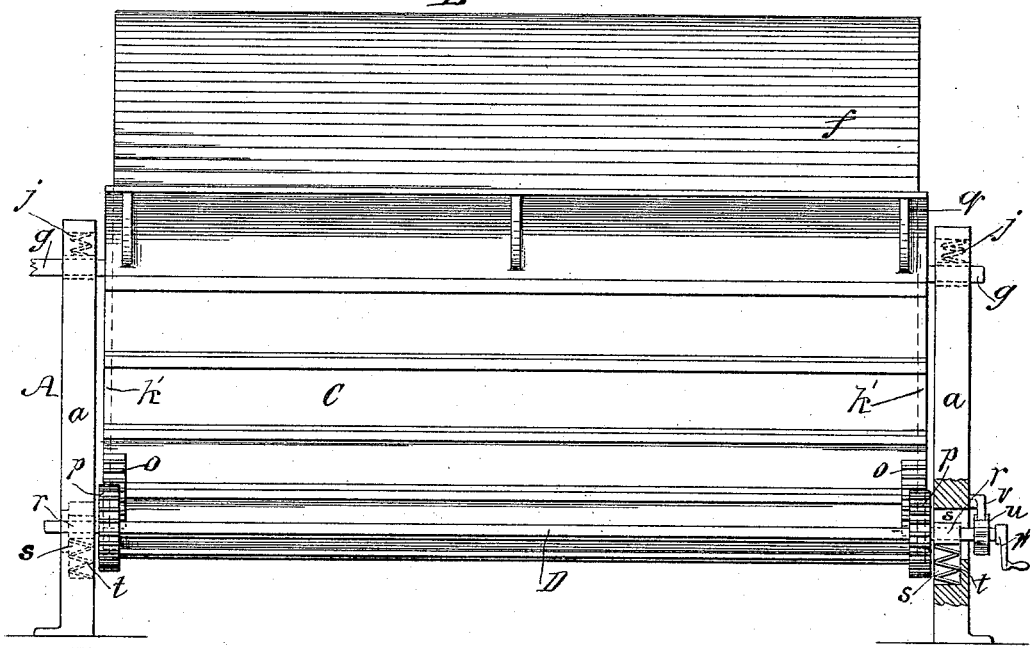
WITNESSES:  INVENTOR:
F. M. Avery
BY
ATTORNEYS.

(No Model.) 2 Sheets—Sheet 2.

F. M. AVERY.
MACERATING MACHINE.

No. 307,702. Patented Nov. 4, 1884.

WITNESSES: INVENTOR:

UNITED STATES PATENT OFFICE.

FRANK M. AVERY, OF BROOKLYN, NEW YORK.

MACERATING-MACHINE.

SPECIFICATION forming part of Letters Patent No. 307,702, dated November 4, 1884.

Application filed July 24, 1884. (No model.)

*To all whom it may concern:*

Be it known that I, FRANK M. AVERY, of Brooklyn, in the county of Kings and State of New York, have invented a new and improved Macerating-Machine, of which the following is a full, clear, and exact description.

This invention relates to a grinding or crushing machine employing a revolving drum and concave, and intended more especially for macerating vegetable substances for obtaining the fibers and juices therefrom; and the invention has for its object to produce an effective, cheap, and durable machine of greatly simplified construction, the same being adapted to be easily and quickly adjusted for different substances, and adapted to yield to avoid breakage in case any hard foreign substance should happen to enter the machine.

The invention consists of the construction, arrangement, and combination of parts, all as hereinafter described and claimed.

Reference is to be had to the accompanying drawings, forming part of this specification, in which similar letters of reference indicate corresponding parts in all the figures.

Figure 1 is a broken end elevation of my new and improved macerating-machine. Fig. 2 is a front elevation of the same, and Fig. 3 shows the preferred form of the concave.

The frame A of the machine is composed in this instance of the corner uprights, $a$ $a$ and $b$ $b$, lower cross-pieces, $c$ $c$, central uprights, $d$ $d$, and upper cross-pieces, $e$ $e$. The drum B is corrugated around its outer surface, as shown at $f$, and the shaft or gudgeons $g$ thereof are journaled in the blocks $h$, placed in corresponding upright slots, $i$, made in the upper cross-pieces, $e$, of the main frame, and above the blocks $h$ are placed in the slots $i$ the springs $j$, which constantly force the drum downward and permit the drum to yield or move slightly upward in the frame in case any hard substance should happen to enter the machine between the drum B and the concave C. The concave C is ribbed or corrugated upon its inner surface, as shown at $k$, and it is formed or provided with the end plates, $k'$ $k'$, which prevent the material being treated from working out from between the drum and the concave, at the ends thereof. The concave C is hinged in the main frame of the machine upon the gudgeons $l$ $l$, formed at the rear corners of the concave, and journaled in the blocks $l'$ $l'$, placed in corresponding horizontal slots, $l^2$ $l^2$, made near the upper ends of the rear uprights, $b$, and the uprights $b$ are each provided at the slots $l^2$ with the screws $l^3$ $l^3$, whereby the blocks $l'$ may be moved in the slots $l^2$ for adjusting the concave laterally, as will be understood from Fig. 1, to set the rear surface of the concave nearer to or farther away from the drum B, to regulate the degree of fineness to which the machine will reduce the material being treated. At $m$ the concave C is perforated for the escape of the juices crushed out of the material being macerated, and the concave is adapted to be adjusted vertically by means of the racks $o$ $o$, formed on the concave, and the cog-wheels $p$ $p$ on shaft D, and the concave is made somewhat larger than the drum D; but it is not made in a true circle, being by preference made on a curve struck from two or more centers, as shown in Fig. 3, so as to preserve a decreasing ratio of opening from the feed-flange to the exit in the adjustment of the concave, and the concave is hinged to the main frame at a point slightly below a horizontal plane passing through the center of the drum B, so that the concave, when adjusted, will always stand with the rear edge nearest to the drum B, leaving a gradually-increasing depth of space between the drum and concave, from the rear to the front edge of the latter, as clearly shown in Fig. 1, so that material fed over the flange $q$ into the machine will be subjected to a gradually-increasing grinding action and pressure until it is discharged over the rear edge of the concave. The shaft D is journaled in the blocks $r$ $r$, placed in the vertical slots $s$ $s$, made in the uprights $a$ $a$ of the main frame A, and the blocks $r$ $r$ rest upon the springs $t$ $t$, so that the shaft and concave C (resting upon the cog-wheels $p$ $p$ on the shaft) have a cushioned support, which will permit the concave C to yield in case any hard foreign substance happens to enter the machine, thus avoiding danger of breakage. The shaft D is provided at one end with the ratchet $u$, with which the pawl $v$ engages for holding the shaft D from backward movement of its own accord, and for holding the shaft when turned to the proper position by the crank w for raising or lowering the concave C.

Constructed in the manner described, it will be seen that the machine is adapted to all the adjustments required, and that it is simple, cheap, and practical, and not liable to break or get out of order.

Having thus described my invention, I claim as new and desire to secure by Letters Patent—

1. In a macerating or grinding machine, the hinged concave C, partially surrounding the drum B and supported upon springs, whereby the concave is adapted to yield, substantially as and for the purposes set forth.

2. The drum B of a macerating or grinding machine, having springs j placed above the bearings of the drum, whereby the drum is adapted to yield, substantially as and for the purposes set forth.

3. The combination, with the upwardly-yielding drum B, of the downwardly-yielding concave C, substantially as described.

4. The concave C, hinged in the main frame in horizontally-adjustable bearings, substantially as and for the purposes set forth.

5. The concave C, made in irregular curve, and combined with the revolving drum B, substantially as shown and described.

6. The concave C, made on a larger circle than the drum B, set eccentric thereto and hinged at a point below the horizontal diameter of the drum B, substantially as and for the purposes set forth.

7. The hinged concave C, formed with the cog-teeth o, in combination with shaft D, having cog-wheels p, meshing with the cog-teeth o, for adjusting the concave, substantially as described.

8. The shaft D, having the cog-wheels p and supported upon the springs s, in combination with the concave C, formed with the racks o, substantially as and for the purposes set forth.

FRANK M. AVERY.

Witnesses:
H. A. WEST,
C. SEDGWICK.